United States Patent

Yokoyama et al.

Patent Number: 5,416,180
Date of Patent: May 16, 1995

[54] SOFT OCULAR LENS MATERIAL

[75] Inventors: Yasuhiro Yokoyama; Noriko Iwata; Eri Ito, all of Nagoya; Shoji Ichinohe; Toshio Yamazaki, both of Annaka, all of Japan

[73] Assignees: Menicon Co., Ltd., Nagoya; Shin-Etsu Chemical Co., Ltd., Tokyo, both of Japan

[21] Appl. No.: 149,530

[22] Filed: Nov. 9, 1993

[30] Foreign Application Priority Data

Nov. 11, 1992 [JP] Japan .................. 4-301153

[51] Int. Cl.$^6$ .......................................... C08F 18/20
[52] U.S. Cl. .................................................. 526/245
[58] Field of Search .......................................... 526/245

[56] References Cited

U.S. PATENT DOCUMENTS 4,433,125  2/1984  Ichinohe et al. .
4,684,705  8/1987  Yamamoto et al. .
5,162,391  11/1992  Ikari .

FOREIGN PATENT DOCUMENTS 0213412  3/1987  European Pat. Off. .
0294515  12/1988  European Pat. Off. .
0379146  8/1991  European Pat. Off. .
2119951  11/1983  United Kingdom .
WO/86/043-41  7/1986  WIPO .
WO/86/043-43  7/1986  WIPO .

Primary Examiner—Joseph L. Schofer
Assistant Examiner—N. Sarofim
Attorney, Agent, or Firm—Oblon, Spivak, McClelland, Maier & Neustadt

[57] ABSTRACT

A soft ocular lens material obtained by copolymerizing polymerizable components comprising (A) a fluorine-containing (meth)acrylate having a hydroxyl group of the formula (I):

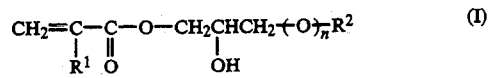

wherein $R^1$ is a hydrogen atom or a methyl group, $R^2$ is a $C_{5\text{-}15}$ perfluoroalkyl group, and n is 0 or 1, (B) a hydrophilic monomer, and (C) at least one monomer selected from the group consisting of silicon-containing (meth)acrylates and siloxane-containing styrene derivatives, wherein the ratio of the amount of the fluorine-containing (meth)acrylate (A) to the amount of the hydrophilic monomer (B) is from 20/80 to 70/30 by weight ratio, and the ratio of the total amount of the fluorine-containing (meth)acrylate (A) and the hydrophilic monomer (B) to the amount of the monomer (C) is from 30/70 to 90/10 by weight ratio.

5 Claims, No Drawings

SOFT OCULAR LENS MATERIAL

The present invention relates to a soft ocular lens material. More particularly, it relates to a soft ocular lens material which is excellent in the oxygen permeability and deposit resistance and has a high mechanical strength and which is thus useful for e.g. contact lenses, intraocular lenses or artificial cornea.

Heretofore, various ocular lens materials have been proposed as contact lens materials or intraocular lens materials. Such ocular lens materials are generally classified into soft materials and hard materials. It is well-known that a soft material is usually preferred as a material for contact lenses giving comfortable feeling to wearers, or as a material for intraocular lenses which can be inserted in a deformed shape through a small incision without damaging eye tissues.

Such soft materials may be classified into a water-absorptive material which swells and softens upon absorption of water and a substantially non-water-absorptive material.

As contact lens materials, those made mainly of 2-hydroxyethyl methacrylate were used. However, such materials had drawbacks such that the oxygen permeability to cornea was inadequate, and lachrymal components were likely to adhere thereto, and contact lenses made of such materials could not be worn for long hours.

Therefore, a high water content soft material made mainly of N-vinyl-2-pyrrolidone was developed as a material for contact lenses which can be worn for long hours. However, such a material had no adequate mechanical strength, since it had high water-absorptivity, and there was no improvement also with respect to the deposit resistance.

As ocular lens materials which are able to solve the above problems, polymer materials made of copolymers comprising, as the main components, a hydrophilic monomer and a fluoro (meth)acrylate (Japanese Unexamined Patent Publications No. 140918/1991 and No. 140919/1991) and non-water-absorptive and water-absorptive soft materials made of copolymers of a hydrophilic monomer such as 2-hydroxyethyl methacrylate or N,N-dimethylacrylamide, a polysiloxane monomer and a fluorine-containing monomer (Japanese Unexamined Patent Publications No. 179422/1991, No. 196117/1991 and No. 196118/1991) were proposed. However, such polymer materials and soft materials were still inadequate in softness.

Further, a contact lens material composed essentially of a fluorine-containing (meth)acrylate having a hydroxyl group, was proposed (Japanese Unexamined Patent Publication No. 97117/1992). However, a soft contact lens made of such a material was inadequate in the mechanical strength such as penetration strength.

Under these circumstances, the present inventors have conducted extensive researches to obtain a soft ocular lens material which is excellent not only in the transparency but also in the oxygen permeability and the deposit resistance and which has high mechanical strength, and as a result, have finally found a material satisfying such physical properties. The present invention has been accomplished on the basis of the discovery.

Thus, the present invention provides a soft ocular lens material obtained by copolymerizing polymerizable components comprising (A) a fluorine-containing (meth)acrylate having a hydroxyl group of the formula (I):

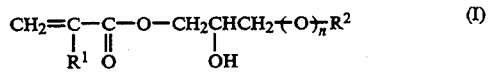

wherein $R^1$ is a hydrogen atom or a methyl group, $R^2$ is a $C_{5-15}$ perfluoroalkyl group, and n is 0 or 1, (B) a hydrophilic monomer, and (C) at least one monomer selected from the group consisting of silicon-containing (meth)acrylates and siloxane-containing styrene derivatives, wherein the ratio of the amount of the fluorine-containing (meth)acrylate (A) to the amount of the hydrophilic monomer (B) is from 20/80 to 70/30 by weight ratio, and the ratio of the total amount of the fluorine-containing (meth)acrylate (A) and the hydrophilic monomer (B) to the amount of the monomer (C) is from 30/70 to 90/10 by weight ratio.

Now, the present invention will be described in detail with reference to the preferred embodiments.

In the above formula (I), $R^2$ is a $C_{5-15}$ linear or branched perfluoroalkyl group. The carbon number of such a perfluoroalkyl group is preferably from 5 to 11. If the carbon number of such a perfluoroalkyl group is less than 5, it will be difficult to impart sufficient flexibility to the soft ocular lens material. On the other hand, if it exceeds 15, the processability of the soft ocular lens material tends to be inadequate.

In the present invention, even when the above perfluoroalkyl group has a branched chain, hydrogen atoms in such a branched chain are all substituted by fluorine atoms.

Further, in the above formula (I), n is 0 or 1. However, n is preferably 0, since the resistance of the ester to hydrolysis is thereby excellent.

Specific examples of the above monomer (A) includes 3-perfluorohexyl-2-hydroxypropyl (meth)acrylate, 3-perfluorooctyl-2-hydroxypropyl (meth)acrylate, 3-(perfluoro-3-(methyl)butyl)-2-hydroxypropyl (meth)acrylate, 3-(perfluoro-7-(methyl)octyl)-2-hydroxypropyl (meth)acrylate, 3-(perfluoro-8-(methyl)decyl)-2-hydroxypropyl (meth)acrylate, 3-(perfluoro-10-(methyl)dodecyl)-2-hydroxypropyl (meth)acrylate, 3-(perfluoro-12-(methyl)tetradecyl)-2-hydroxypropyl (meth)acrylate, 3-perfluorohexyl-2-hydroxypropyloxy (meth)acrylate, 3-perfluorooctyl-2-hydroxypropyloxy (meth)acrylate, and 3-(perfluoro-3-(methyl)butyl)-2-hydroxypropyloxy (meth)acrylate. These monomers may be used alone or in combination as a mixture of two or more. Among them, 3-perfluorohexyl-2-hydroxypropyl (meth)acrylate, 3-perfluorooctyl-2-hydroxypropyl (meth)acrylate and 3-(perfluoro-3-(methyl)butyl)-2-hydroxypropyl (meth)acrylate are particularly preferred, since they have excellent compatibility with the hydrophilic monomer such as N,N-dimethyl (meth)acrylamide which will be described hereinafter.

In the present specification, "(meth)acrylate" means "acrylate and/or methacrylate". This applies to other (meth)acrylate derivatives.

The above-mentioned hydrophilic monomer (hereinafter referred to simply as the monomer (B)) is a component which imparts a hydrophilic property to the resulting ocular lens material and improves the water absorptivity and which makes a soft material.

Such a monomer (B) includes, for example, (meth)acrylamides such as N,N-dimethyl (meth)acrylamide, N,N-dimethylaminopropyl (meth)acrylamide and N- isopropyl (meth)acrylamide, vinyllactums such as N-vinylpyrrolidone, N-vinylpiperidine and N-vinylcaprolactum, hydroxyl group-containing (meth)acrylates such as 2-hydroxyethyl (meth)acrylate, hydroxybutyl (meth)acrylate and hydroxypropyl (meth)acrylate, and (meth)acrylic acid. These hydrophilic monomers may be used alone or in combination as a mixture of two or more. Among them, 3-perfluorohexyl-2-hydroxypropyl (meth)acrylate, 3-perfluorooctyl-2-hydroxypropyl (meth)acrylate and 3-(perfluoro-3-(methyl)butyl)-2-hydroxypropyl (meth)acrylate are preferred, since they have good compatibility and copolymerizability with the above monomer (A), and N,N-dimethyl (meth)acrylamide is particularly preferred.

The above-mentioned at least one monomer (hereinafter referred to simply as the monomer (C)) selected from the group consisting of silicon-containing (meth)acrylates and siloxane-containing styrene derivatives, is a component which further improves the oxygen permeability and the mechanical strength of the resulting soft ocular lens material.

Such silicon-containing (meth)acrylates include, for example, pentamethyldisiloxanylmethyl (meth)acrylate, pentamethyldisiloxanylpropyl (meth)acrylate, methylbis(trimethylsiloxy)silylpropyl (meth)acrylate, tris(trimethylsiloxy)silylpropyl (meth)acrylate, mono[methylbis(trimethylsiloxy)siloxy]bis(trimethylsiloxy)silylpropyl (meth)acrylate, tris[methylbis(trimethylsiloxy)siloxy]silylpropyl (meth)acrylate, methylbis(trimethylsiloxy)silylpropylglyceryl (meth)acrylate, tris(trimethylsiloxy)silylpropylglyceryl (meth)acrylate, mono[methylbis(trimethylsiloxy)siloxy]bis(trimethylsiloxy)silylpropylglyceryl (meth)acrylate, trimethylsilylethyltetramethyldisiloxanylpropylglyceryl (meth)acrylate, trimethylsilylmethyl (meth)acrylate, trimethylsilylpropyl (meth)acrylate, trimethylsilylpropylglyceryl (meth)acrylate, trimethylsiloxydimethylsilylpropylglyceryl (meth)acrylate, pentamethyldisiloxanylpropylglyceryl (meth)acrylate, methylbis(trimethylsiloxy)silylethyltetramethyldisiloxanylmethyl (meth)acrylate, tetramethyltriisopropylcyclotetrasiloxanylpropyl (meth)acrylate and tetramethyltriisopropylcyclotetrasiloxybis(trimethylsiloxy)silylpropyl (meth)acrylate.

The above-mentioned siloxane-containing styrene derivatives may, for example, be compounds represented by the formula (II):

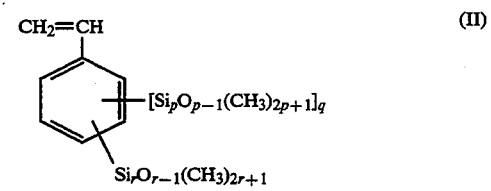

wherein p is an integer of from 1 to 15, q is 0 or 1, and r is an integer of from 1 to 15, provided that when q is 0, r is not 1.

In the siloxane-containing styrene derivatives of the above formula (II), if p or r is an integer of 16 or more, purification or synthesis of such siloxane-containing styrene derivatives tends to be difficult, and if q is an integer of 2 or more, such derivatives tend to be hardly synthesized.

Typical examples of the compounds of the formula (II) include tris(trimethylsiloxy)silylstyrene, bis(trimethylsiloxy)methylsilylstyrene, (trimethylsiloxy)dimethylsilylstyrene, tris(trimethylsiloxy)siloxydimethylsilylstyrene, [bis(trimethylsiloxy)methylsiloxy]dimethylsilylstyrene, (trimethylsiloxy)dimethylsilylstyrene, heptamethyltrisiloxanylstyrene, nonamethyltetrasiloxanylstyrene, pentadecamethylheptasiloxanylstyrene, heneicosamethyldecasiloxanylstyrene, heptacosamethyltridecasiloxanylstyrene, hentriacontamethylpentadecasiloxanylstyrene, trimethylsiloxypentamethyldisiloxymethylsilylstyrene, tris(pentamethyldisiloxy)silylstyrene, (tristrimethylsiloxy)siloxybis(trimethylsiloxy)silylstyrene, bis(heptamethyltrisiloxy)methylsilylstyrene, tris[methylbis(trimethylsiloxy)siloxy]silylstyrene, trimethylsiloxybis[tris(trimethylsiloxy)siloxy]silylstyrene, heptakis(trimethylsiloxy)trisiloxanylstyrene, nonamethyltetrasiloxyundecylmethylpentasiloxymethylsilylstyrene, tris[tris(trimethylsiloxy)siloxy]silylstyrene, tris(trimethylsiloxy)hexamethyltetrasiloxy(tris-trimethylsiloxy)siloxytrimethylsiloxysilylstyrene, nonakis(trimethylsiloxy)tetrasiloxanylstyrene, bis(tridecamethylhexasiloxy)methylsilylstyrene, heptamethylcyclotetrasiloxanylstyrene, heptamethylcyclotetrasiloxybis(trimethylsiloxy)silylstyrene and tripropyltetramethylcyclotetrasiloxanylstyrene.

These monomers (C) may be used alone or in combination as a mixture of two or more, as mentioned above. Among such monomers (C), tris(trimethylsiloxy)silylpropyl (meth)acrylate and tris(trimethylsiloxy)silylstyrene are preferred, since they are excellent in the compatibility with copolymerizable optional components.

The ratio of the amount of the above monomer (A) to the amount of the monomer (B) is usually from 20/80 to 70/30, preferably from 30/70 to 60/40, by weight ratio. If such a ratio is less than this range, the oxygen permeability and the stain resistance of the resulting soft ocular lens material tend to be low, and the mechanical strength of the material tends to be inadequate. On the other hand, if the ratio exceeds the above range, the amount of the monomer (B) tends to relatively small, whereby the hydrophilic nature of the resulting soft ocular lens material tends to be low.

Further, the ratio of the total amount of the monomer (A) and the monomer (B) to the amount of the monomer (C) is usually from 30/70 to 90/10, preferably from 40/60 to 80/20, by weight ratio. If such a ratio is less than this range, it tends to be difficult to impart softness to the resulting ocular lens material, and the material tends to be hard. On the other hand, if the ratio exceeds the above range, the amount of the monomer (C) tends to be relatively small, whereby no adequate effets of further improving the oxygen permeability by the incorporation of such a monomer (C) tend to be obtained.

In the present invention, a usual crosslinking agent may be employed as an optional component to obtain a soft ocular lens material. Such a crosslinking agent forms a three dimensional crosslinking structure in the soft ocular lens material and thus makes the material tough and imparts improved mechanical strength or hardness, and it further serves to provide a soft ocular lens material which is uniform, transparent and free from turbidity or distortion and which is excellent in the optical properties. Further, it also provides other crosslinking effects, such as effects of improving durability such as chemical resistance, heat resistance or dimensional stability as well as effects of reducing eluates.

Specific examples of such a crosslinking agent include 4-vinylbenzyl (meth)acrylate, 3-vinylbenzyl (meth)acrylate, ethylene glycol di(meth)acrylate, diethylene glycol di(meth)acrylate, triethylene glycol di(meth)acrylate, propylene glycol di(meth)acrylate, dipropylene glycol di(meth)acrylate, allyl (meth)acrylate, vinyl (meth)acrylate, trimethylolpropane tri(meth)acrylate, methacryloyloxyethyl (meth)acrylate, divinylbenzene, diallyl phthalate, diallyl adipate, triallyl isocyanurate, α-methylene-N-vinylpyrrolidone, 2,2-bis(4-(meth)acryloyloxyphenyl)hexafluoropropane, 2,2-bis(3-(meth)acryloyloxyphenyl)hexafluoropropane, 2,2bis(2-(meth)acryloyloxyphenyl)hexafluoropropane, 2,2bis(4-(meth)acryloyloxyphenyl)propane, 2,2-bis(3(meth)acryloyloxyphenyl)propane, 2,2-bis(2(meth)acryloyloxyphenyl)propane, 1,4-bis(2(meth)acryloyloxyhexafluoroisopropyl)benzene, 1,3-bis(2(meth)acryloyloxyhexafluoroisopropyl)benzene, 1,2-bis(2(meth)acryloyloxyhexafluoroisopropyl)benzene, 1,4-bis(2-(meth)acryloyloxypropyl)benzene, 1,3-bis(2-(meth)acryloyloxyisopropyl)benzene and 1,2-bis(2(meth)acryloyloxyisopropyl)benzene. These crosslinking agents may be used alone or in combination as a mixture of two or more.

The amount of the crosslinking agent is usually from 0.01 to 20% by weight, preferably from 0.05 to 10% by weight, based on the total amount of copolymerizable components. If such an amount is less than 0.01% by weight, no adequate effects of using the crosslinking agent tend to be obtained. On the other hand, if the ratio exceeds 20% by weight, the resulting soft ocular lens material tends to be brittle and thus tends to be weak against a stress such as a shock.

In the present invention, copolymerizable components comprising the above-mentioned monomers (A), (B) and (C) and if required the above-mentioned crosslinking agent, are copolymerized to obtain a copolymer. However, in addition to these components, other monomers copolymerizable therewith (hereinafter referred to as additional copolymerizable components) may be employed.

The combination and the respective amounts of such additional copolymerizable components may be suitably adjusted depending upon the desired soft ocular lens material.

Specific examples of such additional copolymerizable components include styrene derivatives such as o-methylstyrene, m-methylstyrene, p-methylstyrene, p-ethylstyrene, o-hydroxystyrene, m-hydroxystyrene, p-hydroxystyrene, trimethylstyrene, tert-butylstyrene, perbromostyrene, dimethylaminostyrene and α-methylstyrene; linear, branched or cyclic alkyl (meth)acrylates such as methyl (meth)acrylate, ethyl (meth)acrylate, propyl (meth)acrylate, n-butyl (meth)acrylate, tert-butyl (meth)acrylate, isobutyl (meth)acrylate, n-pentyl (meth)acrylate, tert-pentyl (meth)acrylate, hexyl (meth)acrylate, 2-methylbutyl (meth)acrylate, heptyl (meth)acrylate, octyl (meth)acrylate, 2-ethylhexyl (meth)acrylate, nonyl (meth)acrylate, decyl (meth)acrylate, dodecyl (meth)acrylate, stearyl (meth)acrylate, cyclopentyl (meth)acrylate, and cyclohexyl (meth)acrylate; linear, branched or cyclic dialkyl fumarates such as diethyl fumarate, dipropyl fumarate, diisopropyl fumarate, dibutyl fumarate, di-tert-butyl fumarate, dipentyl fumarate, dioctyl fumarate, di-tert-amyl fumarate, didodecyl fumarate, di(2-ethylhexyl) fumarate, dicyclohexyl fumarate, di(tert-butylcyclohexyl) fumarate and bis(trimethylcyclohexyl) fumarate; silicon-containing fumarates such as bis(trimethylsilylpropyl) fumarate, bis(pentamethyldisiloxanylpropyl) fumarate, bis[(trimethylsiloxy)tetramethyldisiloxanyl)propyl]fumarate, bis[(trimethylbis(trimethylsiloxy)disiloxanyl)propyl]fumarate, and bis[(tetrakis(trimethylsiloxy)trimethyltrisiloxanyl)propyl]fumarate; aminoalkyl (meth)acrylates such as aminoethyl (meth)acrylate, N-methylaminoethyl (meth)acrylate, and N,N-dimethylaminoethyl (meth)acrylate; alkoxide group-containing (meth)acrylates such as methoxyethyl (meth)acrylate, ethoxyethyl (meth)acrylate, and methoxydiethylene glycol (meth)acrylate; aromatic group-containing (meth)acrylates such as benzyl (meth)acrylate; grycidyl (meth)acrylate; and tetrahydrofurfuryl (meth)acrylate. These additional copolymerizable components may be used alone or in combination as a mixture of two or more.

In the present invention, when it is desired to obtain a contact lens material having better oxygen permeability, a dialkyl fumarate or a silicon-containing fumarate is mainly preferably selected among the above additional copolymerizable components.

When it is desired to reinforce the lens material to obtain a soft ocular lens material having good strength or to adjust the hardness of the soft ocular lens material, an alkyl (meth)acrylate, styrene, a styrene derivative or (meth)acrylic acid is mainly preferably selected among the above additional copolymerizable components.

When it is desired to obtain a soft ocular lens material having a high refractive index, styrene, a styrene derivative or an aromatic ring-containing (meth)acrylate is preferably selected among the above additional copolymerizable components.

The amount of such additional copolymerizable components may be optionally determined depending upon the particular purpose of the resulting soft ocular lens material. However, their amount is usually not more than 50% by weight, preferably from 10 to 40% by weight, based on the total amount of copolymerizable components. If their amount exceeds 50% by weight, the resulting ocular lens material tends to be hard.

Further, in the present invention, a macromonomer as disclosed in Japanese Unexamined Patent Publication No. 188717/1990, No. 213820/1990 or No. 43711/1991, may be used as a copolymerizable component to obtain a soft ocular lens material. By using such a macromonomer, it is possible to obtain a contact lens material having the oxygen permeability further improved. The amount of such a macromonomer may be at the same level as the amount of the above-mentioned additional copolymerizable components. Among such macromonomers, the one having at least two polymerizable groups in its molecule, may be employed also as the above-mentioned crosslinking agent.

Further, in order to impart ultraviolet absorptivity or a color to the resulting soft ocular lens material, a polymerizable ultraviolet absorber, a polymerizable dyestuff or a polymerizable ultraviolet absorbing dyestuff may, for example, be used as an additional copolymerizable component.

Specific examples of the polymerizable ultraviolet absorber include benzophenone type polymerizable ultraviolet absorbers such as 2-hydroxy-4-(meth)acryloyloxybenzophenone, 2-hydroxy-4-(meth)acryloyloxy-5-tert-butylbenzophenone, 2-hydroxy-4-(meth)acryloyloxy-2',4'-dichlorobenzophenone and 2-hydroxy-4-(2'-hydroxy-3'-(meth)acryloyloxypropoxy)-benzophenone; benzotriazole type polymerizable ultraviolet absorbers such as 2-(2'-hydroxy-5'-(meth)acryloyloxyethylphenyl)-2H-benzotriazole, 2-(2'-hydroxy-5'-(meth)acryloyloxyethylphenyl)-5-chloro- 2H-benzotriazole, 2-(2'-hydroxy-5'-(meth)acryloyloxypropylphenyl)-2H-benzotriazole and 2-(2'-hydroxy-5'-(meth)acryloyloxypropyl-3'-tert-butylphenyl)-5-chloro-2H-benzotriazole; salicylic acid derivative-type polymerizable ultraviolet absorbers such as phenyl 2-hydorxy-4-(meth)acryloyloxymethylbenzoate; and other polymerizable ultraviolet absorbers such as methyl 2-cyano-3-phenyl-3-(3'-(meth)acryloyloxyphenyl)propenoate. These polymerizable ultraviolet absorbers may be used alone or in combination as a mixture of two or more of them.

Specific examples of the polymerizable dyestuff include azo type polymerizable dyestuffs such as 1-phenylazo-4-(meth)acryloyloxynaphthalene, 1-phenylazo-2-hydroxy-3-(meth)acryloyloxynaphthalene, 1-naphthylazo-2-hydroxy-3-(meth)acryloyloxynaphthalene, 1(α-anthrylazo)-2-hydroxy-3-(meth)acryloyloxynaphthalene, 1-((4'-(phenylazo)phenyl)azo)-2-hydroxy-3-(meth)acryloyloxynaphthalene, 1-(2',4'-xylylazo )-2-(meth)acryloyloxynaphthalene, 1-(o-tolylazo)-2-(meth)acryloyloxynaphthalene, 2-(m-(meth)acryloylamide-anilino)-4,6-bis(1'-(o-tolylazo)-2'-naphthylamino)-1,3,5-triazine, 2-(m-vinylanilino)-4-((4'-nitrophenylazo)-anilino)-6-chloro-1,3,5-triazine, 2-(1'-(o-tolylazo)-2'-naphthyloxy-4-(m-vinylanilino)-6-chloro-1,3,5-triazine, 2-(p-vinylanilino)-4-(1'-(o-tolylazo)-2'-naphthylamino)6-chloro-1,3,5-triazine, N-(1'-(o-tolylazo)-2'-naphthyl)-3-vinylphthalic acid monoamide, N-(1'-(o-tolylazo)-2'-naphthyl)-6-vinylphthalic acid monoamide, 3-vinylphthalic acid-(4'-(p-sulfophenylazo)-1'-naphthyl)monoester, 6-vinylphthalic acid-(4'-(p-sulfophenylazo)-1'-naphthyl)monoester, 3-(meth)acryloylamide-4-phenylazophenol, 3-(meth)acryloylamide-4-(8'-hydroxy-3',6'-disulfo-1'-naphthylazo)phenol, 3-(meth)acryloylamide-4-(1'-phenylazo-2'-naphthylazo)phenol, 3-(meth)acryloylamide-4-(ptolylazo)phenol, 2-amino-4-(m-(2'-hydroxy-1'-naphthylazo)anilino)-6-isopropenyl-1,3,5-triazine, 2-amino-4-(N-methyl-p-(2'-hydroxy-1'-naphthylazo)anilino)-6-isopropenyl-1,3,5-triazine, 2-amino-4-(m-(4'-hydroxy-1'-phenylazo)anilino)-6-isopropenyl-1,3,5-triazine, 2-amino-4-(N-methyl-p-(4'-hydroxyphenylazo)anilino)-6-isopropenyl-1,3,5-triazine, 2-amino-4-(m-(3'-methyl-1'-phenyl-5'-hydroxy-4'-pyrazolylazo) anilino)-6-isopropenyl-1,3,5-triazine, 2-amino-4-(N-methyl-p-(3'-methyl-1-phenyl-5'-hydroxy-4'-pyrazolylazo) anilino)-6-isopropenyl-1,3,5-triazine, 2-amino-4-(p-phenylazoanilino)-6-isopropenyl-1,3,5-triazine and 4-phenylazo-7-(meth) acryloylamide-1-naphthol; anthraquinone type polymerizable dyestuffs such as 1,5-bis((meth)acryloylamino)-9,10-anthraquinone, 1-(4'-vinylbenzoylamide)-9,10-anthraquinone, 4-amino-1-(4-vinylbenzoylamide)-9,10-anthraquinone, 5-amino-1-(4'-vinylbenzoylamide)-9,10-anthraquinone, 8-amino-1-(4'-vinylbenzoylamide)-9,10-anthraquinone, 4-nitro-1-(4'-vinylbenzoylamide)-9,10-anthraquinone, 4-hydroxy-1-(4'-vinylbenzoylamide)-9,10-anthraquinone, 1-(3'-vinylbenzoylamide)-9,10-anthraquinone, 1-(2'-vinylbenzoylamide)-9,10-anthraquinone, 1-(4'-isopropenylbenzoylamide)-9,10-anthraquinone, 1-(3'-isopropenylbenzoylamide)-9,10-anthraquinone, 1-(2'-isopropenylbenzoylamide)-9,10-anthraquinone, 1,4-bis-( 4'-vinylbenzoylamide)-9,10-anthraquinone, 1,4-bis-(4'-isopropenylbenzoylamide)-9,10-anthraquinone, 1,5-bis-(4'-vinylbenzoylamide)-9,10-anthraquinone, 1,5-bis-(4'-isopropenylbenzoylamide)-9,10-anthraquinone, 1-methylamino-4-(3'-vinylbenzoylamide)-9,10-anthraquinone, 1-methylamino-4-(4'-vinylbenzoyloxethylamino)-9,10-anthraquinone, 1-amino-4-(3'-vinylphenylamino)-9,10-anthraquinone-2-sulfonic acid, 1-amino-4-(4'-vinylphenylamino)-9,10-anthraquinone-2-sulfonic acid, 1-amino-4-(2'-vinylbenzylamino)-9,10-anthraquinone-2-sulfonic acid, 1-amino-4-(3'-(meth)acryloylaminophenylamino)-9,10-anthraquinone-2-sulfonic acid, 1-amino-4-(3'-(meth)acryloylaminobenzylamino)-9,10-anthraquinone-2-sulfonic acid, 1-(β-ethoxycarbonylallylamino)-9,10-anthraquinone, 1-(β-carboxyallylamino)-9,10-anthraquinone, 1,5-di-(β-carboxyallylamino)-9,10-anthraquinone, 1-(β-isopropoxycarbonylallylamino)-5-benzoylamide-9,10-anthraquinone, 2-(3'-(meth)acryloylamide-anilino)-4-(3'-(3''-sulfo-4''-aminoanthraquinon-1''-yl) amino-anilino)-6-chloro-1,3,5triazine, 2-(3'-(meth)acryloylamide-anilino)-4-(3'-(3''-sulfo-4''-aminoanthraquinon-1''-yl) amino-anilino)-6-hydrazino-1,3,5-triazine, 2,4-bis-((4''-methoxyanthraquinon-1''-yl)amino)-6-(3'-vinylanilino)1,3,5-triazine and 2-(2'-vinylphenoxy)-4-(4'-(3-sulfo-4''-aminoanthraquinon-1''-yl-amino) anilino)-6-chloro-1,3,5-triazine; nitro type polymerizable dyestuffs such as onitroanilinomethyl (meth)acrylate; and phthalocyanine type polymerizable dyestuffs such as (meth)acryloyl-modified tetraamino copper phthalocyanine and (meth)acryloyl-modified (dodecanoyl-modified tetraamino copper phthalocyanine). These polymerizable dyestuffs may be used alone or in combination as a mixture of two or more of them.

Specific examples of the polymerizable ultraviolet absorbing dyestuff include benzophenone type polymerizable ultraviolet absorbing dyestuffs such as 2,4-dihydroxy-3-(p-styrenoazo)benzophenone, 2,4-dihydroxy-5-(p-styrenoazo)benzophenone, 2,4-dihydroxy-3-(p-(meth)acryloyloxymethylphenylazo)benzophenone, 2,4-dihydroxy-5-(p-(meth)acryloyloxymethylphenylazo)benzophenone, 2,4-dihydroxy-3-(p-(meth)acryloyloxyethylphenylazo)benzophenone, 2,4-dihydroxy-5-(p-(meth)acryloyloxyethylphenylazo)benzophenone, 2,4-dihydroxy-3-(p-(meth)acryloyloxypropylphenylazo)benzophenone, 2,4-dihydroxy-5-(p-(meth)acryloyloxypropylphenylazo)benzophenone, 2,4-dihydroxy-3-(o-(meth)acryloyloxymethylphenylazo)benzophenone, 2,4-dihydroxy-5-(o-(meth)acryloyloxymethylphenylazo)benzophenone, 2,4-dihydroxy-3-(o-(meth)acryloyloxyethylphenylazo)benzophenone, 2,4-dihydroxy-5-(o-(meth)acryloyloxyethylphenylazo)benzophenone, 2,4-dihydroxy-3-(o-(meth)acryloyloxypropylphenylazo)benzophenone, 2,4-dihydroxy-5-(o-(meth)acryloyloxypropylphenylazo)benzophenone, 2,4-dihydroxy-3-(p-(N,Ndi(meth)acryloyloxyethylamino)phenylazo)benzophenone, 2,4-dihydroxy-5-(p-(N,N-di(meth)acryloyloxyethylamino)phenylazo)benzophenone, 2,4-dihydroxy-3-(o-(N,Ndi(meth)acryloyloxyethylamino)phenylazo)benzophenone, 2,4-dihydroxy-5-(o-(N,Ndi(meth)acryloylethylamino)phenylazo)benzophenone, 2,4-dihydroxy-3-(p-(N-ethyl-N(meth)acryloyloxyethylamino)phenylazo)benzophenone, 2,4-dihydroxy-5-(p-(N-ethyl-N(meth)acryloyloxyethylamino)phenylazo)benzophenone, 2,4-dihydroxy-3-(o-(N-ethyl-N(meth)acryloyloxyethylamino)phenylazo)benzophenone, 2,4-dihydroxy-5-(o-(N-ethyl-N(meth)acryloyloxyethylamino)-phenylazo)benzophenone, 2,4-dihydroxy-3-(p-(N-ethyl-N(meth)acryloylamino)phenylazo)benzophenone, 2,4-dihydroxy-5-(p-(N-ethyl-N(meth)acryloylamino)-phenylazo)benzophenone, 2,4-dihydroxy-3-(o-(N-ethyl-N(meth)acryloylamino)phenylazo)benzophenone and 2,4-dihydroxy-5-(o-(N-ethyl-N(meth)acryloylamino)- phenylazo)benzophenone; and benzoic acid type polymerizable ultraviolet absorbing dyestuffs such as phenyl 2-hydroxy-4-(p-styrenoazo)benzoate. These polymerizable ultraviolet absorbing dyestuffs may be used alone or in combination as a mixture of two or more of them.

The amounts of the above-mentioned polymerizable ultraviolet absorber, polymerizable dyestuff and polymerizable ultraviolet absorbing dyestuff are substantially influenced by the thickness of the lens, and they are preferably not more than 3 parts by weight, more preferably from 0.1 to 2 parts by weight, per 100 parts by weight of the total amount of monomers to be subjected to polymerization. If the amount exceeds 3 parts by weight, the physical properties of the lens such as mechanical strength, tend to deteriorate. Further, in consideration of the toxicity of the ultraviolet absorber or dyestuff, such a material tends to be unsuitable as a material for ocular lenses such as contact lenses which are in direct contact with living tissues or intraocular lenses embedded in living bodies. Further, particularly in the case of a dyestuff, if the amount is too large, the color of the lens tends to be so deep that the transparency decreases, and visible rays tend to be hardly transmitted through the lens.

The soft ocular lens material of the present invention can be obtained by copolymerizing the copolymerizable components comprising the above-mentioned monomers (A), (B) and (C) and optionally the crosslinking agent and additional copolymerizable components. In the present invention, it is possible to obtain a non-water absorptive material or a water-absorptive material by properly adjusting the combination and the amounts of the above-mentioned copolymerizable components.

As a method for producing the soft ocular lens material of the present invention, a method for obtaining a copolymer may, for example, be mentioned which comprises blending the respective components uniformly, adding a polymerization initiator and polymerizing the mixture by a conventional method.

Such a method for obtaining the copolymer may, for example, be a method (heat polymerization) in which a radical polymerization initiator is incorporated to the copolymerizable components, followed by heating to gradually raise the temperature from room temperature to 130° C. over a period of about 10 hours to complete the polymerization, a method (photopolymerization) wherein a photopolymerization initiator is incorporated to the copolymerizable components, followed by irradiating the mixture with a light with a wavelength corresponding to the adsorption of the photopolymerization initiator, such as ultraviolet rays, to conduct the polymerization, or a combination of such heat polymerization and photopolymerization.

To conduct the above heat polymerization, heating may be conducted in a constant temperature tank or in a constant temperature chamber, or an electromagnetic wave such as a microwave may be irradiated, and such heating may be conducted stepwise. When the above photopolymerization is employed, a sensitizer may further be incorporated.

The production of the ocular lens material may be carried out, for example, by bulk polymerization or solution polymerization. However, it is usually preferred to employ bulk polymerization to produce the material efficiently.

Specific examples of the above radical polymerization initiator include azobisisobutylonitrile, azobisdimethylvaleronitrile, benzoyl peroxide, tert-butyl hydroperoxide and kumene peroxide.

Specific examples of the above photopolymerization initiator include benzoine type photopolymerization initiators such as benzoine, methylorthobenzoyl benzoate, methylorthobenzoine benzoate, methylbenzoyl formate, benzoine methyl ether, benzoine ethyl ether, benzoine isopropyl ether, benzoine isobutyl ether, and benzoine n-butyl ether; phenone type photopolymerization initiators such as 2-hydroxy-2-methyl-1-phenylpropane-1-one, p-isopropyl-$\alpha$-hydroxyisobutylophenone, p-tertbutyltrichloroacetophenone, 2,2-dimethoxy-2phenylacetophenone, $\alpha,\alpha$-dichloro-4-phenoxyacetophenone, and 4,4'-bisdiethylaminobenzophenone; 1-hydroxycyclohexylphenyl ketone; 1-phenyl-1,2-propanedione-2-(o-ethoxycarbonyl)oxime; thioxanthone type photopolymerization initiators such as 2-chlorothioxanthone, and 2-methylthioxanthone; dibenzosubalone; 2-ethylanthraquinone; benzophenone acrylate; benzophenone; and benzil.

These radical polymerization initiators or photopolymerization initiators may be used alone or in combination as a mixture of two or more of them. The amount of such a polymerization initiator may be at a level sufficient to initiater the polymerization and is usually from 0.1 to 2 parts by weight, preferably from about 0.01 to 1 part by weight, per 100 parts by weight of the total amount of copolymerizable components.

To shape the soft ocular lens material thus obtained into ocular lenses such as contact lenses or intraocular lenses, shaping methods commonly used by those skilled in the art may be employed.

As such shaping methods, there may be mentioned, for example, a lathe cutting and grinding method and a molding method. The cutting and grinding method is a method in which the polymerization is conducted in a suitable mold or vessel to obtain a rod-, block- or plate-shaped base material (polymer), and then the base material is processed into a desired shape by mechanical processing such as cutting, grinding and polishing. The molding method is a method wherein a mold corresponding to the shape of a desired ocular lens is prepared, and the polymerization of the above-mentioned lens components is conducted in this mold to obtain a molded product, which may further be subjected to mechanical finishing treatment, if necessary.

The ocular lens material of the present invention is a material which is soft at a temperature around room temperature, and a shaping method by a molding method is usually preferred. As a molding method, a spin casting method or a static casing method is known.

Apart from these methods, it is possible to employ a method for the present invention in which a monomer capable of forming a hard polymer is impregnated in a lens material, and then such a monomer is polymerized to harden the entirety, which is then subjected to cutting and grinding processing, and from a product processed to a desired shape, the hard polymer is removed to obtain a shaped product composed of the lens material (Japanese Unexamined Patent Publications No. 278024/1987 and No. 118541/1989).

Now, soft contact lens material of the present invention will be described in further detail with reference to Examples. However, it should be understood that the present invention is by no means restricted to such specific Examples.

EXAMPLE 1

33 parts by weight of 3-perfluorohexyl-2-hydroxypropyl methacrylate, 33 parts by weight of N,N-dimethylacrylamide, 33 parts by weight of tris(trimethylsiloxy)silylpropyl methacrylate, 0.5 part by weight of ethylene glycol dimethacrylate and 0.1 part by weight of 2,2'-azobis(2,4-dimethylvaleronitrile) as a polymerization initiator, were uniformly mixed to obtain a solution. This solution was put into a glass test tube.

Then, the test tube was transferred into a circulation type constant-temperature bath and heated at 30° C. for 64 hours and at 50° C. for 56 hours. Then, it was transferred into an air circulating oven, and copolymerization was conducted by raising the temperature to 110° C. at a rate of 10° C. per two hours to obtain a rod-shaped copolymer having a diameter of 13.5 mm. Such a copolymer was bent and then released, whereupon it immediately returned to the initial state, thus showing excellent resiliency. Thus, this copolymer was found to have suitable flexibility as a soft ocular lens material.

The obtained rod-shaped copolymer was subjected to hydration treatment and then cut into specimens having a thickness of 0.2 mm, which were then subjected to cutting and polishing treatment to obtain test specimens. Various physical properties of the test specimens were measured in accordance with the following methods. The results are shown in Table 1.

(a) Transparency

The appearance of a test specimen treated by hydration treatment, was visually observed and evaluated in accordance with the following evaluation standards.
Evaluation standards
◯: Transparent
 : Slightly turbid
X: Substantially turbid (b) Deposit resistance (tackiness)

A test specimen was touched with a finger, and the releasability from the test specimen was examined and evaluated in accordance with the following evaluation standards.
Evaluation standards
◯: Finger readily released
 : Finger slightly hardly released
X: Finger hardly released (c) Oxygen permeability coefficient The oxygen permeability coefficient of a test specimen was measured in a physiological saline at 35° C. by means of Seikaken Type film oxygen permeability measuring instrument manufactured by Rika Seiki Kogyo Kabushiki Kaisha. The unit for oxygen permeability coefficient is $(cm^2/sec).(mlO_2/(ml \times mmHg))$. The oxygen permeability coefficients in Table 1 are numerical values obtained by multiplying the values of the oxygen permeability coefficients with the thickness of the test specimens being 0.2 mm by $10^{11}$.

(d) Water content

The water content (wt%) of the test specimen treated by hydration treatment, was measured in accordance with the following equation:

$$\text{Water content (wt \%)} = \frac{W - Wo}{W} \times 100$$

where W is the weight (g) of the test specimen upon absorption of water to the equilibrium state after the hydration treatment, and Wo is the weight (g) of the test specimen which was dried to the dried state in a drier after the hydration treatment.

(e) Penetration strength

By means of a penetration strength tester, a pressing needle having a diameter of 1/16 inch was pressed against the center of a test specimen, and the load (g) at the time of the breakage of the test specimen was measured. However, the values listed in Table 1 are values calculated as the thickness of the test specimens was 0.2 mm.

(f) Elongation

The elongation (%) at the time of the breakage of the test specimen in the above-mentioned measurement of the penetration strength (g), was measured.

EXAMPLES 2 TO 7 AND COMPARATIVE EXAMPLES 1 TO 5

In the same manner as in Example 1, various components were blended to have compositions as identified in Table 1 and polymerized to obtain rod-shaped copolymers, which were then subjected to cutting and polishing treatment to obtain test specimens. Various physical properties of the obtained test specimens were examined in the same manner as in Example 1. The results are shown in Table 1. The copolymers of Examples 2 to 7 had flexibility suitable for soft ocular lens materials, like the copolymer of Example 1.

TABLE 1

| | | Examples | | | | | | | Comparative Examples | | | | |
|---|---|---|---|---|---|---|---|---|---|---|---|---|---|
| | | 1 | 2 | 3 | 4 | 5 | 6 | 7 | 1 | 2 | 3 | 4 | 5 |
| Composition (parts by weight) | FHeHPA | 33 | 33 | 33 | 33 | — | — | — | — | — | 50 | — | — |
| | FOHPA | — | — | — | — | 33 | — | — | — | — | — | 50 | — |
| | FMBHPMA | — | — | — | — | — | 33 | 33 | — | — | — | — | 50 |
| | FBHPA | — | — | — | — | — | — | — | 50 | — | — | — | — |
| | DMAA | 33 | 33 | 33 | 33 | 33 | 33 | 33 | 50 | 50 | 50 | 50 | 50 |
| | SiMA | 33 | — | 33 | — | 33 | 33 | — | — | 50 | — | — | — |
| | SiSt | — | 33 | — | 33 | — | — | 33 | — | — | — | — | — |
| | EDMA | 0.5 | 0.5 | — | — | 0.5 | 0.5 | 0.5 | 0.5 | 0.5 | 0.5 | 0.5 | 0.5 |
| | V-65 | 0.1 | 0.1 | 0.1 | 0.1 | 0.1 | 0.1 | 0.1 | 0.1 | 0.1 | 0.1 | 0.1 | 0.1 |
| Physical properties | Transparency | ◯ | ◯ | ◯ | ◯ | ◯ | ◯ | ◯ | ◯ | ◯ | ◯ | ◯ | ◯ |
| | Deposit resistance (tackiness) | ◯ | ◯ | ◯ | ◯ | ◯ | ◯ | ◯ | ◯ | ◯ | ◯ | ◯ | ◯ |
| | Oxygen permeability coefficient | 73 | 57 | 73 | 65 | 64 | 59 | 51 | 33 | 52 | 27 | 29 | 21 |
| | Water content | 56 | 29 | 30 | 29 | 28 | 27 | 19 | 43 | 48 | 43 | 45 | 42 |
| | Penetration strength | 454 | 746 | 985 | 711 | 415 | 756 | 1051 | 147 | 182 | 240 | 318 | 272 |
| | Elongation | 192 | 54 | 521 | 85 | 181 | 93 | 19 | 95 | 106 | 139 | 131 | 18 |

The abbreviations used in Table 1 are as follows:
FHeHA: 3-perfluorohexyl-2-hydroxypropyl acrylate
FOHPA: 3-perfluorooctyl-2-hydroxypropyl acrylate FMBHPMA: 3-(perfluoro-3-(methyl)butyl)-2-hydroxypropyl methacrylate
FBHPA: 3-perfluorobutyl-2-hydroxypropyl acrylate
DMAA: N,N-dimethylacrylamide
SiMA: tris(trimethylsiloxy)silylpropyl methacrylate
SiSt: tris(trimethylsiloxy)silylstyrene
EDMA: ethylene glycol dimethacrylate
V-65: 2,2'-azobis (2,4-dimethylvaleronitrile)

It is evident from the results shown in Table 1 that the soft ocular lens materials obtained in Examples 1 to 7 have high mechanical strength as compared with the ocular lens materials obtained in Comparative Examples 1 to 5, and they are excellent not only in the oxygen permeability but also in the transparency and the lipid-staining resistance.

The soft ocular lens material of the present invention has an effect such that it is excellent in the softness and can be suitably used as a soft contact lens material which provides a comfortable feeling to wearers.

Further, the soft ocular lens material of the present invention is excellent in the oxygen permeability, and when it is formed into a contact lens, it is free from impairing the metabolic function of cornea. Further, it has practically adequate mechanical strength, and it provides an effect that it can be formed into a lens which is hardly broken when subjected to various physical treatments.

Further, the soft ocular lens material of the present invention has little surface tackiness, and has an effect that a deposit of e.g. lipids hardly adheres.

We claim:

1. A soft ocular lens material obtained by copolymerizing polymerizable components comprising (A) a fluorine-containing (meth)acrylate having a hydroxyl group of the formula (I):

wherein $R^1$ is a hydrogen atom or a methyl group, $R^2$ is a $C_{5-15}$ perfluoroalkyl group, and n is 0, (B) N,N-dimethylacrylamide, and (C) at least one monomer selected from the group consisting of tris(trimethylsiloxy)silylpropyl (meth)acrylate and tris(trimethylsiloly)silyl styrene, wherein the ratio of the amount of the fluorine-containing (meth)acrylate (A) to the amount of N,N-dimethylacrylamide (B) is from 30/70 to 60/40 by weight ratio, and the ratio of the total amount of the fluorine-containing (meth)acrylate (A) and N,N-dimethylacrylamide (B) to the amount of the monomer (C) is from 40/60 to 80/20 by weight ratio.

2. The soft ocular lens material according to claim 1, wherein the copolymerizable components further contain from 0.01 to 20% by weight of a crosslinking agent.

3. The soft ocular lens material according to claim 1, wherein the fluorine-containing (meth)acrylate (A) is at least one member selected from the group consisting of 3-perfluorohexyl-2-hydroxypropyl (meth)acrylate, 3-perfluoroctyl-2-hydroxypropyl (meth)acrylate, 3-(perfluoro-3-(methyl)butyl)-2-hydroxypropyl (meth)acrylate, 3-(perfluoro-7-(methyl)octyl)-2hydroxypropyl (meth)acrylate, 3-(perfluoro-8-(methyl)decyl)-2-hydroxypropyl (meth)acrylate, 3-(perfluoro-10-(methyl)dodecyl)-2-hydroxypropyl (meth)acrylate, 3-(perfluoro-12-(methyl)tetradecyl)-2-hydroxypropyl (meth)acrylate, 3-perfluorohexyl-2-hydroxypropyloxy (meth)acrylate, 3-perfluoroctyl-2-hydroxypropyloxy (meth)acrylate, and 3-perfluoro-3-(methyl)butyl)-2-hydroxypropyloxy (meth)acrylate.

4. The soft ocular lens material according to claim 2, wherein the crosslinking agent is at least one member selected from the group consisting of 4-vinylbenzyl (meth)acrylate, 3-vinylbenzyl (meth)acrylate, ethylene glycol di(meth)acrylate, diethylene glycol di(meth)acrylate, triethylene glycol di(meth)acrylate, propylene glycol di(meth)acrylate, dipropylene glycol di(meth)acrylate, allyl (meth)acrylate, vinyl (meth)acrylate, trimethyrolepropane tri(meth)acrylate, methacryloyloxyethyl (meth)acrylate, divinylbenzene, diallyl phthalate, diallyl adipate, triallyl isocyanurate, α-methylene-N-vinylpyrrolidone, 2,2-bis(4-(meth)acryloyloxyphenyl)hexafluoropropane, 2,2-bis(3-(meth)acryloyloxyphenyl)hexafluoropropane, 2,2-bis(2-(meth)acryloyloxyphenyl)hexafluoropropane, 2,2-bis(4-(meth)acryloyloxyphenyl)propane, 2,2-bis(3-(meth)acryloyloxyphenyl)propane, 2,2-bis(2-(meth)acryloyloxyphenyl)propane, 1,4-bis(2-(meth)acryloyloxyhexafluoroisopropyl)benzene, 1,3-bis(2-(meth)acryloyloxyhexafluoroisopropyl)benzene, 1,2-bis(2-(meth)acryloyloxyhexafluoroisopropyl)benzene, 1,4-bis(2-(meth)acryloyloxypropyl)benzene, 1,3-bis(2-(meth)acryloyloxyisopropyl)benzene and 1,2-bis(2-(meth)acryloyloxyisopropyl)benzene.

5. The soft ocular lens material according to claim 1, wherein N,N-dimethylacrylamide is present in an amount of from 33 to 56% by weight based on the total weight of monomers A, B, and C.

* * * * *